United States Patent
De Vaujany

(10) Patent No.: US 6,406,579 B1
(45) Date of Patent: Jun. 18, 2002

(54) PROCESS FOR MANUFACTURING ANTI-THEFT AND/OR TRACEABILITY DEVICES ASSOCIATED WITH STOPPERING MEANS

(75) Inventor: Robert De Vaujany, Genas (FR)

(73) Assignee: Manufacture Lyonnaise de Bouchage-MLB, Genas (FR)

(*) Notice: Subject to any disclaimer, the term of this patent is extended or adjusted under 35 U.S.C. 154(b) by 0 days.

(21) Appl. No.: 09/549,207

(22) Filed: Apr. 13, 2000

(30) Foreign Application Priority Data

Apr. 27, 1999 (FR) .............................. 99 05486

(51) Int. Cl.[7] .............................................. B32B 31/18
(52) U.S. Cl. ................. 156/176; 156/178; 156/250; 156/299; 156/302; 156/303
(58) Field of Search ................. 156/176, 178, 156/250, 297, 299, 302, 303

(56) References Cited

U.S. PATENT DOCUMENTS 5,182,062 A * 1/1993 Lee et al. .................. 264/129
6,123,796 A * 9/2000 Kathmann et al. ......... 156/249

FOREIGN PATENT DOCUMENTS

| EP | 0 585 076 A2 | 3/1994 |
|----|--------------|--------|
| EP | 0619 243 A1 | 10/1994 |
| EP | 0 698 561 A1 | 2/1996 |
| EP | 0 847 931 A1 | 6/1998 |
| FR | 2 740 109 | 4/1997 |
| GB | 2 298 391 A | 9/1996 |
| WO | WO 9714126 * | 4/1997 |
| WO | 98/15469 | 4/1998 |

* cited by examiner

Primary Examiner—Michael W. Ball
Assistant Examiner—John T. Haran
(74) Attorney, Agent, or Firm—Oliff & Berridge, PLC

(57) ABSTRACT

Process for manufacturing anti-theft and/or traceability devices associated with stoppering and covering means The invention relates to the high-rate industrial manufacture of remote-detectable devices used in particular as anti-theft devices but also to carry information, associated with means for stoppering and covering containers. To this end, a material in web form is unwound and caused to travel along, and at least one detectable means such as a filament or an oriented-particles film or an electronic tag is deposited in continuous or discontinuous form on this material, this or these detectable means running or following on from one another in the direction of travel of the web-form material. This material is cut according to the singular or plural detectable means deposited on it, so as to separate individual elements each equipped with a detectable means such as a filament, and themselves constituting stoppering or covering means, or parts of such means, for example gaskets for caps.

8 Claims, 4 Drawing Sheets

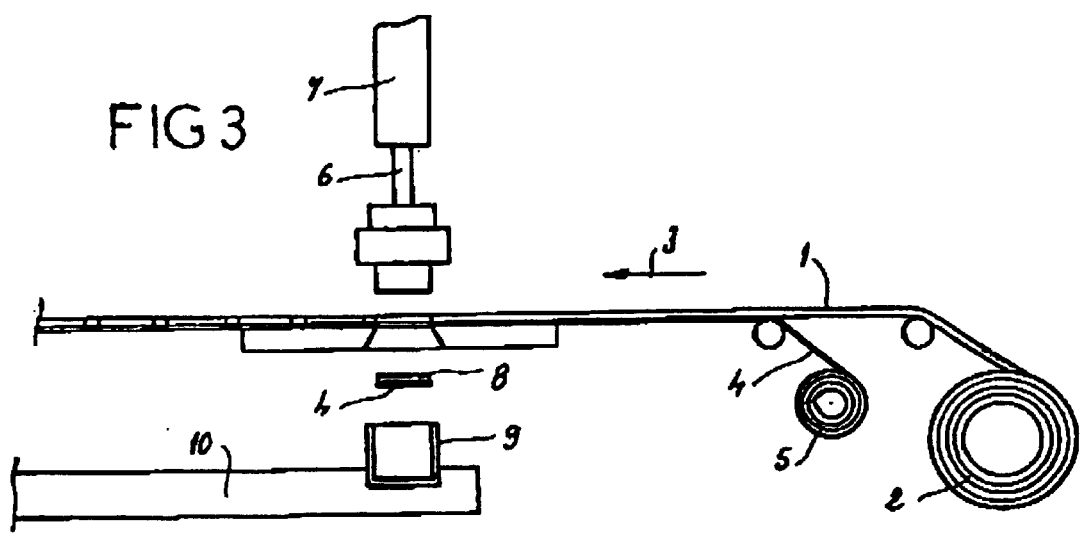
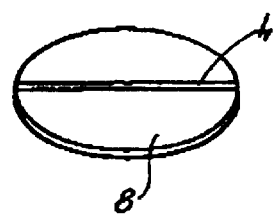
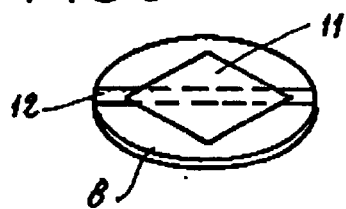
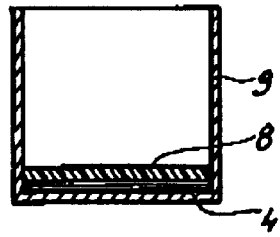
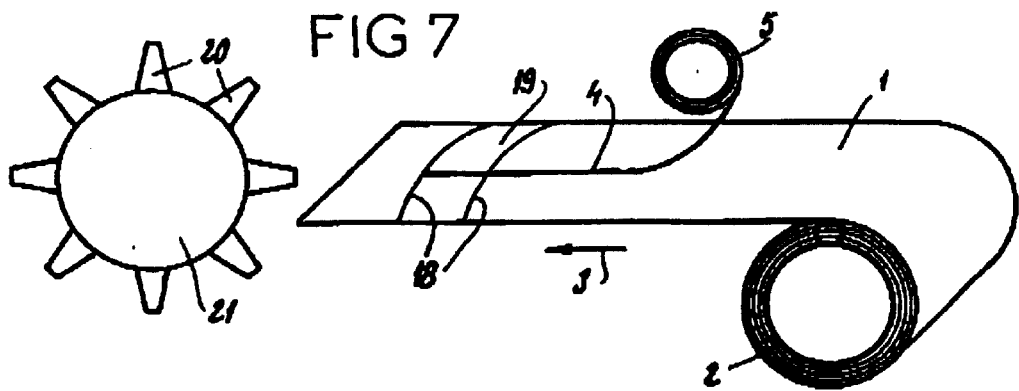

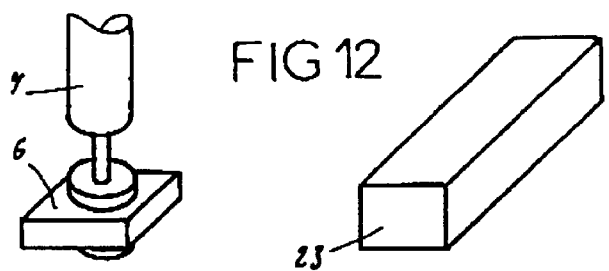
FIG 12
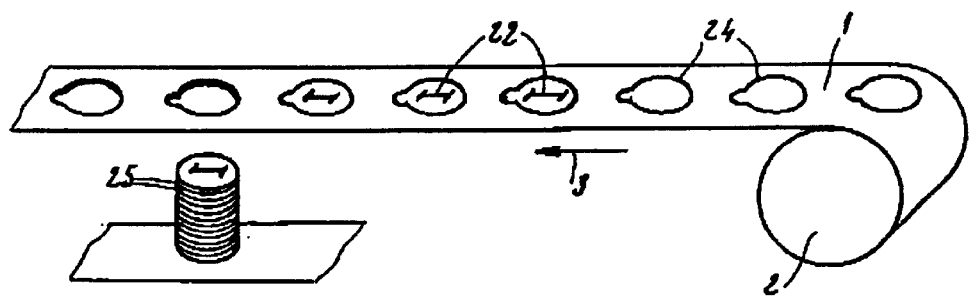
FIG 13
FIG 14
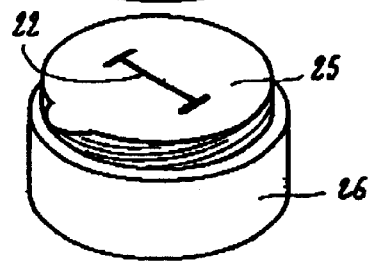
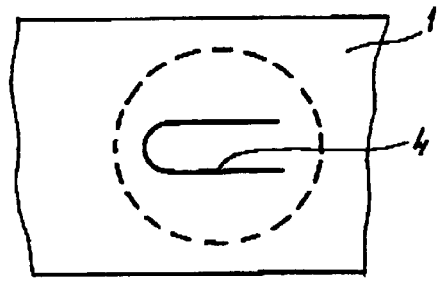
FIG 15
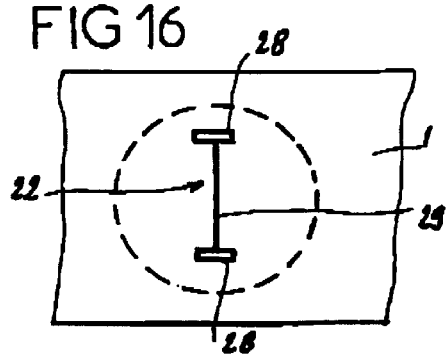
FIG 16
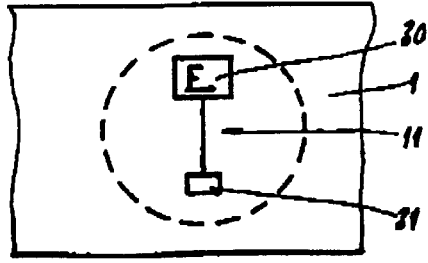
FIG 17

PROCESS FOR MANUFACTURING ANTI-THEFT AND/OR TRACEABILITY DEVICES ASSOCIATED WITH STOPPERING MEANS

BACKGROUND OF THE INVENTION

The present invention relates to an industrial process for the high-rate manufacture of remote-detectable devices used in particular as anti-theft devices but also as devices for carrying information, namely so-called "traceability" devices associated with means for stoppering and covering containers such as bottles, flasks, pots and other similar packagings for drinks and other food products, cosmetic products, etc.

The problem of theft, particularly in "self-service" sales outlets arises especially in the case of articles of relatively high value such as certain alcoholic drinks (wines, spirits), or alternatively beauty products.

DESCRIPTION OF THE PRIOR ART

In general, the fight against the theft of products in "self-service" sales outlets is currently provided, with increasing frequency, by the use of devices which can be detected remotely either by an electromagnetic or by a radiofrequency route, these often being known as "electronic tags", but which can consist simply of metal filaments. These devices are detected automatically as they are passed through the pay desks or on leaving the store, setting off an alarm if they have not been deactivated. Furthermore, in the case of devices involving an electronic chip, which can store varying amounts of various kinds of information, it is possible to obtain so-called "intelligent" tags capable of identifying the packaged product, so as to attest to its authenticity, provide traceability, and supply various items of information relating to this product, for example its production date or its "best before" date or simply its identification reference (as a replacement for a conventional bar code).

In the particular case of containers, such as bottles, it has proved advantageous to incorporate the electronic tags or the filaments with an anti-theft and/or identification function, into the stoppering or covering means customarily fitted to these containers. Thus, French patent No. 2703659 and the corresponding European patent No. 0619243, in the name of the Applicant, describe, in particular, the possibility of applying a detectable means, forming an anti-theft device, under a cap used to stopper a bottle, or to a disk-shaped gasket, itself housed under the cap. Instead of integrating said detectable means into the container stopper, it is also conceivable for it to be concealed in a covering element in the form of a sleeve, generally known as an "outer cover" which is also fairly customarily fitted to bottles containing alcoholic beverages (wines, sparkling wines, etc.). By way of example, reference may here also be made to French patent application No. 2754248 and to the corresponding international patent application No. WO 9815469.

At the present time, the detectable means, whether these be electronic tags or simple filaments, are becoming increasingly miniaturized, which means that it is envisagable for their use to be generalized, particularly to stoppering members even of a small diameter. However, the current processes used to produce the stoppering or covering means equipped individually with such detectable means are still themselves fairly expensive, and of low output, which explains why the use of such detectable means is, for the time being, reserved for relatively expensive products, for which they represent only a small fraction of the overall cost, thus making their use economically viable.

SUMMARY OF THE INVENTION

The present invention sets out to avoid these drawbacks by providing a high-performance process for the manufacture of anti-theft devices and the like associated with stoppering and covering means, such as those mentioned hereinabove.

To this end, the process according to the invention essentially consists in unwinding a material in web form and causing it to travel along in a predetermined direction, in depositing at least one detectable means such as a filament or an oriented-particles film or an electronic tag in continuous or discontinuous form, on this web-form material, this or these detectable means running or following on from one another in the direction of travel of the web-form material, and in cutting said web-form material according to the singular or plural detectable means deposited on it so as to separate individual elements, each equipped with a detectable means such as a filament or an oriented-particles film or an electronic tag, and themselves constituting stoppering or covering means or parts of such means.

Thus, the invention affords a "continuous" manufacturing process allowing the high-rate production of stoppering or covering means equipped with detectable devices of the electronic tag or oriented-particles film or filament or similar type.

According to a first embodiment of this process, suited to detectable devices in the form of filaments, at least one continuous filament is unwound at the same time as the web-form material, this filament being deposited and fixed, for example by adhesive bonding, to said web-form material in the direction in which the latter travels, and elements which, once separated, each comprise a length of filament are cut in succession from this web-form material.

Advantageously, two or more continuous filaments are unwound and deposited here simultaneously, in parallel lines, on the same traveling web-form material, and transverse rows of two or more elements are cut in succession from this web-form material according to the number and position of the filaments so that each of these elements, once separated, comprises a length of filament. This embodiment in particular makes it possible to obtain, at a high rate, disk-shaped gaskets for stoppering caps, these gaskets each being equipped with a length of filament arranged across a diameter.

According to an alternative form of the process that is the subject of the invention, at least one continuous tape, preferably an adhesive tape, is unwound at the same time as the web-form material, this tape bearing separate detectable devices such as electronic tags, antennas or discontinuous lengths of filament at regular intervals, the or each tape is deposited on the web-form material in the direction in which the latter travels, and elements which, once separated, each comprise a detectable device such as an electronic tag, antenna or length of filament are cut in succession from this web-form material.

In this last instance, two or more continuous tapes, each of which bears separate detectable devices such as electronic tags, antennas or lengths of filament at regular intervals are also advantageously unwound and deposited in parallel lines on the traveling web-form material, and transverse rows of two or more elements are cut in succession from this web-form material according to the number and position of the tapes, so that each of these elements, once separated, comprises a detectable device such as an electronic tag, antenna or length of filament.

To produce covering means of the "outer cover" kind, each equipped with a detectable device, it is, however, preferable to unwind and deposit a single continuous filament or a single continuous tape bearing separate detectable devices such as electronic tags, antennas or lengths of filament at regular intervals on the traveling web-form material, and the web-form material is chalked along transverse lines, preferably slightly curved lines, so as to separate elements each of which comprises a length of filament, an electronic tag or an antenna, each element thus isolated then being rolled up on itself to form the sleeve-shaped part of a covering means of the "outer cover" kind which will thus be equipped with a detectable device, particularly an anti-theft device, for example in the form of a filament arranged along a generatrix.

According to another embodiment of the process that is the subject of the present invention, separate detectable devices such as electronic tags, antennas or lengths of filament are deposited in succession on the traveling web-form material and elements of the inner seal type, each comprising a detectable device such as an electronic tag, an antenna or a length of filament are then cut in succession from this web-form material according to the detectable devices deposited. The process of the invention may thus be implemented on a press used for cutting out heat-sealable inner seals, of a known type, requiring only a limited amount of adaptation, an apparatus of the labeling machine kind being used here to affix the detectable devices, such as electronic tags, in turn. Insofar as the web-form material is pre-printed with designs which correspond to the figure inner seals, the assembly allows identification for positioning the detectable devices according to the printing on the web-form material and therefore according to the positions of the inner seals that are to be cut from this web-form material. The detectable devices are thus deposited in good alignment with the future cuts that are to correspond to the inner seals with anti-theft device that are to be obtained.

In its entirety, the process that is the subject of the invention makes is possible, using the same principle and with simple adaptations, to manufacture various types of stoppering and covering means individually equipped with detectable means constituting, in particular, anti-theft devices and/or traceability devices.

BRIEF DESCRIPTION OF THE DRAWINGS

In any event, the invention will be better understood with the aid of the description which follows, with reference to the appended diagrammatic drawing which, by way of example, illustrates a number of embodiments of this process for the manufacture of anti-theft and/or traceability devices associated with stoppering and covering means:

FIG. 3 is a detail in longitudinal section, relating to the process of FIGS. 1 and 2;

FIG. 4 depicts a gasket equipped with a filament, as obtained by the process of FIG. 1;

FIG. 5 depicts a gasket equipped with an electronic tag, as obtained by the process of FIG. 2;

FIG. 6 is a view in section of a cap equipped with such a gasket;

FIG. 7 is an overall perspective view illustrating another embodiment of the invention, applied to the manufacture of outer covers each equipped with a filament;

FIG. 12 is an overall perspective view illustrating another embodiment of the invention, applied to the manufacture of heat-sealable inner seals, each equipped with a detectable device in the form of an antenna;

FIG. 13 is a perspective view of a pot, open, equipped with such a heat-sealed inner seal;

FIG. 14 is a perspective view illustrating the application of the invention to the manufacture of heat-sealable inner seals equipped with electronic tags;

FIGS. 15, 16 and 17 depict, in greater detail, various forms of detectable devices to which the present invention applies.

DESCRIPTION OF THE PREFERRED EMBODIMENTS

Figure 1:
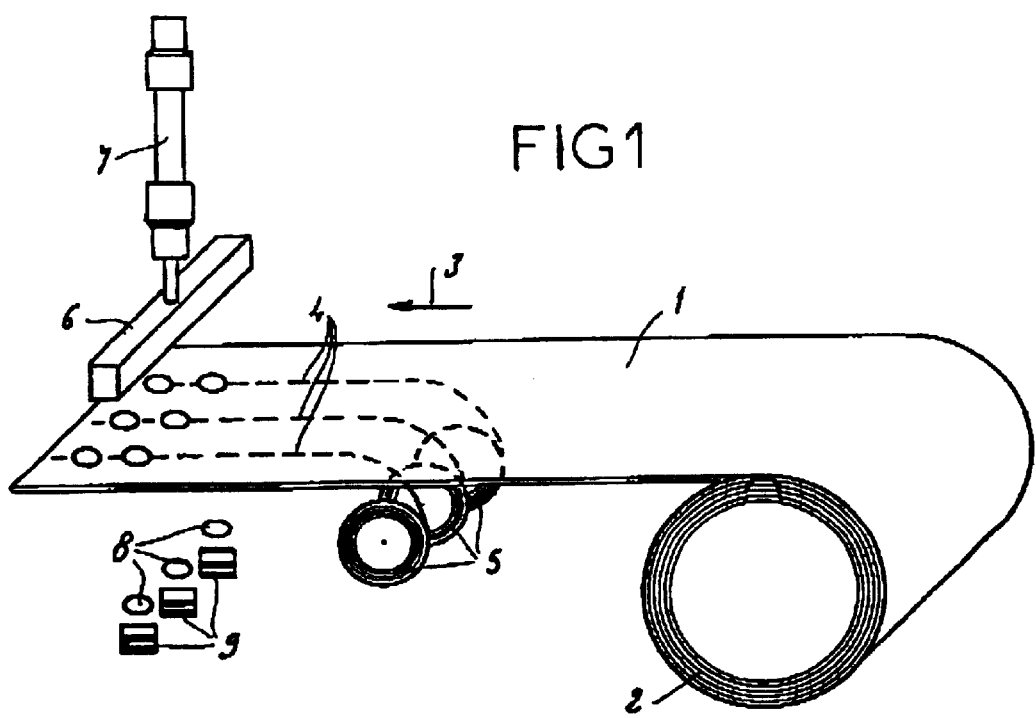
FIG. 1 is an overall perspective view illustrating a first embodiment of the invention, applied to the manufacture of gaskets each equipped with a filament.

FIG. 1 illustrates the manufacture of disk-shaped gaskets, each provided with a detectable device produced in the form of a simple filament. The gaskets are cut from material in web form 1 such as, in particular, a synthetic substance, which is continuously unwound from a reel 2 and which travels horizontally in the direction of the arrow 3.

Unwound in synchronism under the web-form material 1 as it travels, are a number of continuous metal filaments 4, for example three filaments, which come from respective reels 5. The filaments 4 are unwound and deposited on the web-form material 1, in lines which are mutually parallel and parallel to the direction of travel 3 of said web-form material 1. Each filament 4 is advantageously borne by an adhesive tape, which is stuck under the web-form material 1.

Downstream of the region at which the filaments 4 are applied to the web-form material 1, the device comprises a multiple-punch tool 6 running transversely to the direction of travel 3 of the web-form material and actuated by a ram 7—see also FIG. 3. The tool 6 is designed to cut out three disk-shaped gaskets 8 according to the positions of the three filaments 4 deposited on the web-form material 1, each time the ram 7 is actuated. Thus, gaskets 8 are separated which, as shown in FIG. 4, each carry a length of filament 4 arranged on one of their faces, across a diameter.

Referring once again to FIGS. 1 and 3, the gasket 8 thus cut out and equipped with lengths of filament 4 can be placed immediately inside rigid stoppering caps 9 made of metal or synthetic substance or any other material, for example borne by a turntable 10. This then yields stoppering caps 9 each of which is equipped with a detectable device in the form of a filament 4 borne by the gasket 8 introduced into each of these caps 9, and more particularly, a detectable device that is concealed between the gasket 8 and the cap 9—see also FIG. 6.

Figure 2:
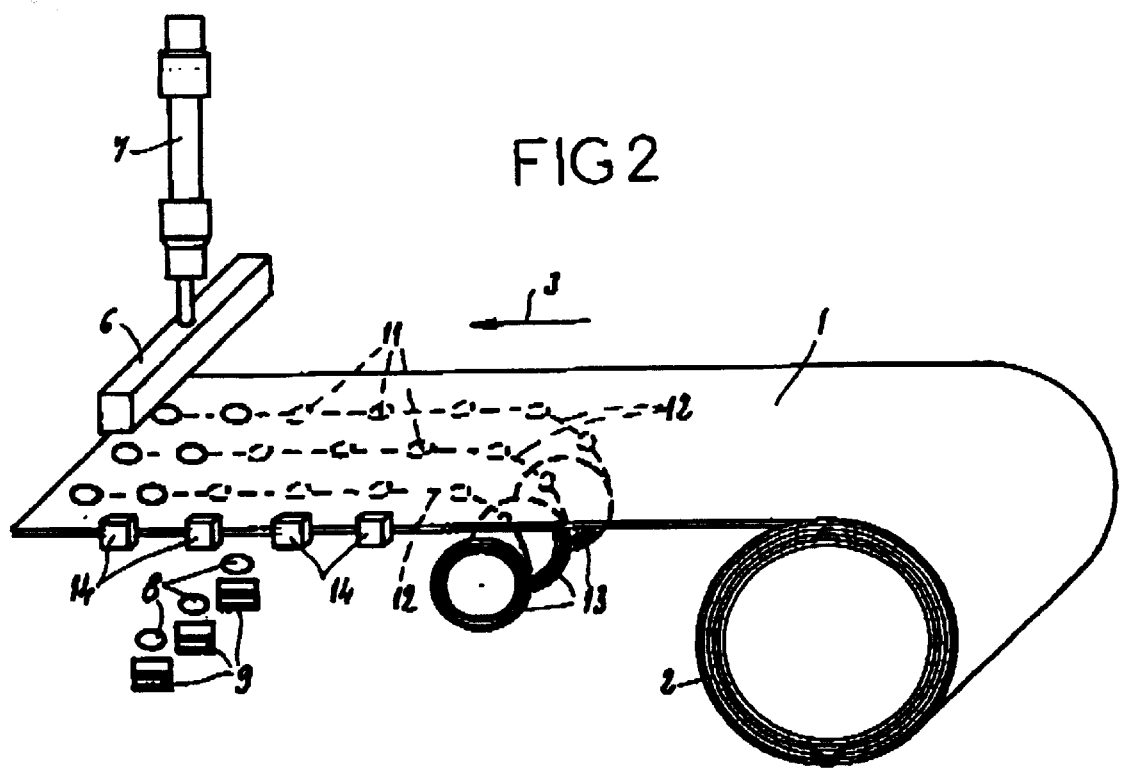
FIG. 2 is an overall perspective view illustrating an alternative form of the process of FIG. 1, applied to the manufacture of gaskets each equipped with an electronic tag.

By way of an alternative, FIG. 2 illustrates the manufacture of gaskets 8 each equipped, on one of their faces, with an electronic tag 11, as also shown in FIG. 5.

As before, such gaskets 8 are manufactured by unwinding material 1 in web form from a reel 2 and causing it to travel horizontally in the direction of the arrow 3. Unwound and deposited in synchronism under the traveling web-form material 1 are three parallel lines of electronic tags 11, borne at regular intervals and initially joined together by three adhesive tapes 12 from respective reels 13.

The multiple-punch tool 6, similar to the one in FIGS. 1 and 3, here too cuts out three gaskets 8 according to the three lines of electronic tags 12, each time its ram 7 is actuated. Optical detectors 14, arranged on the same side as the web-form material 1 as it travels, in this instance identify the electronic tags 11 deposited on this web-form material 1, so as to synchronize the actuation of the tool 6 with the passage of the electronic tags 11 under the punches.

As illustrated again in FIG. 3, the gaskets 8 thus cut out and individually equipped with an electronic tag 11 can be placed immediately in the stoppering caps 9.

The electronic tags 11 considered here are, in particular, electronic chips but the same process may also be used to deposit any other detectable devices of a discontinuous nature, such as antennas or lengths of filament, or alternatively simple prints of oriented magnetic ink on the web-form material 1.

Whereas the preceding examples relate to the equipping of stoppering means, in this particular instance caps 9, with various detectable devices, the subsequent FIGS. 7 to 11 relate to the manufacture of covering means of the "outer cover" kind, also to be equipped with a detectable device. An outer cover 15 of this kind comprises, in the customary way, a sleeve 16 which is closed off at one end by a circular pellet 17—see FIG. 10.

As shown in FIG. 7, material 1 in the form of a web, such as aluminum, synthetic material or a complex, is, here again, unwound from a reel 2 and made to travel horizontally in the direction of the arrow 3. A single continuous metal filament 4 is unwound from a reel 5 above the web-form material 1 as it travels. The filament 4 is deposited on the web-form material 1 in a line parallel to the direction of travel 3 of said web-form material 1. The filament 4 is advantageously borne by an adhesive tape, which sticks to the web-form material 1.

A blade (not depicted) is used, downstream of the region in which the filament 4 is applied to the web-form material 1, to make cuts along transverse line 18, which may be slightly curved. The web-form material 1 is thus cut into elements 19 each of which comprises a length of filament 4, the contour of an element 19 corresponding to the developed shape of the sleeve part 16 of an outer cover 15.

Each element 19, thus isolated and pre-equipped with a length of filament 4, is conveyed onto a former 20, borne by a rotary drum 21 equipped, at its periphery, with a number of such formers 20. Each former 20 is used to form the "sleeve" part 16 of an outer cover 15 by winding the element 19 which it receives right around the former.

Once the pellet 17 has been added at one end of the sleeve 16, the complete outer cover 15 is obtained, this being equipped with a length of filament 4 acting as an anti-theft device, along one generatrix of its "sleeve" part 16, on the opposite side to the area of overlap.

Figure 8:
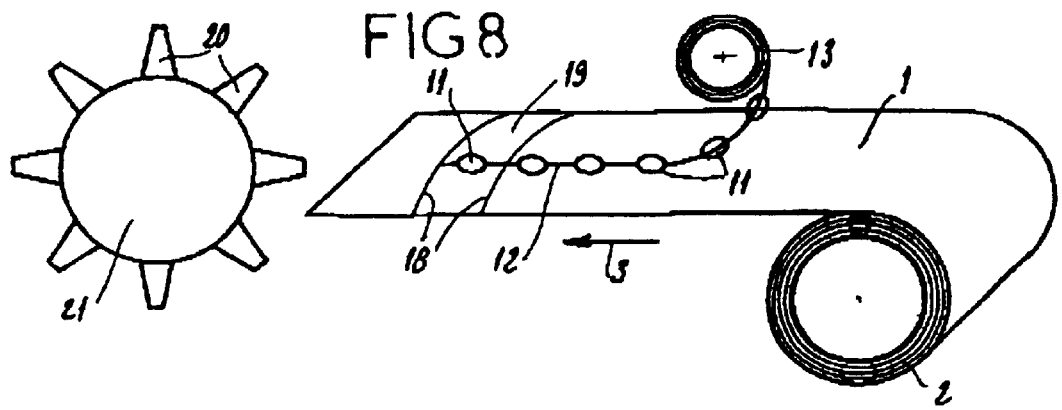
FIG. 8 is an overall perspective view illustrating an alternative form of the process of FIG. 7, applied to the manufacture of outer covers each equipped with an electronic tag.
Figure 9:
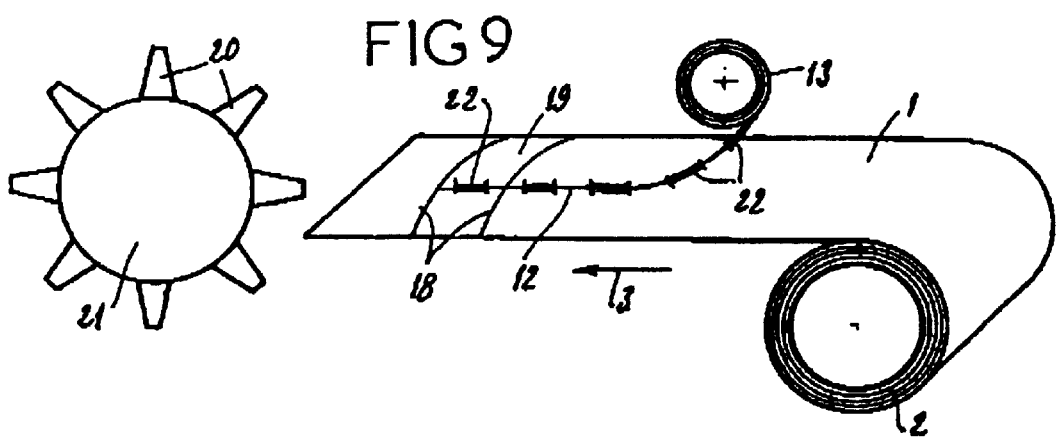
FIG. 9 is an overall perspective view illustrating another alternative form of the process of FIG. 7, applied to the manufacture of outer covers equipped with antennas.
Figure 10:
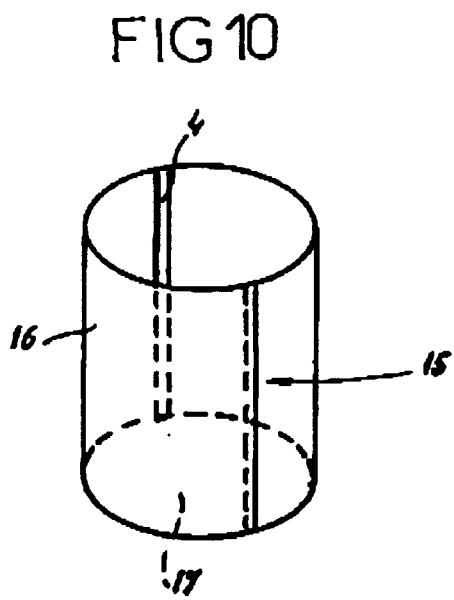
FIG. 10 depicts a perspective view of an outer cover with filament, as obtained by the process of FIG. 7.
Figure 11:
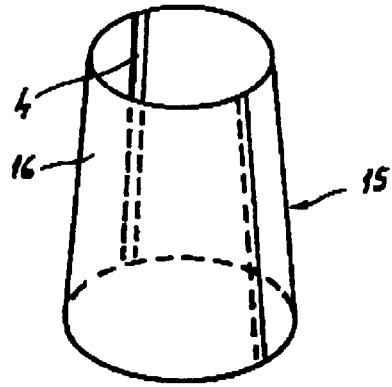
FIG. 11 is a perspective view similar to FIG. 10, relating to alternative form of the other cover.

FIGS. 8 and 9 illustrate two alternative forms of manufacture of such outer covers equipped with detectable devices; the elements which correspond to those of FIG. 7 are denoted by the same references, and will not be described again here.

According to the process of FIG. 8, electronic tags 11 borne at regular intervals and connected together by an adhesive tape 12 are unwound from a reel 13 and deposited on the web-form material 1 traveling in the direction of the arrow 3. The tape 12 is deposited on and stuck to the web-form material 1 in a line parallel to the direction of travel 3 of said web-form material 1. The cuts in the web-form material 1 are made along transverse lines 18, which are slightly curved, and which in this instance pass between the successive electronic tags 11. Thus, the web-form material 1 is chopped into elements 19 which each comprise an electronic tag 11. Each element 19 thus isolated and pre-equipped with an electronic tag 11 is here again conveyed onto a former 20 which, by winding this element 19 around it, shapes the "sleeve" part of the outer cover that is to be manufactured, which will be equipped with the electronic tag 11 (instead of the length of filament 4).

According to the process of FIG. 9, "antennas" 22, borne at regular intervals and joined together by an adhesive tape 12 are unwound from a reel 13 and deposited on the web-form material 1 traveling in the direction of the arrow 3. Incidentally, this process is similar to that of FIG. 7 already described, except that the electronic tags are replaced by the antennas 22, for example in the shape of an "H". Outer covers 15 will thus be obtained, the "sleeve" part of which, resulting from the elements 19 cut from the web-form material 1, will comprise an antenna 22, instead of the length of filament or electronic tag of the preceding examples.

It is possible to obtain an outer cover 15 of practically cylindrical shape (FIG. 10) or an outer cover 15 of a somewhat pronounced frustoconical appearance (FIG. 11) depending on the shape of the elements 19 cut from the web-form material 1.

FIG. 2 illustrates the manufacture of heat-sealable inner seals each equipped with a detectable device which, in the example taken, adopt the shape of an H-shaped antenna 22. A device 23 of the labeling machine kind affixes antennas 22 at regular intervals to a strip of heat-sealable material 1 such as aluminum or complex unwound from a reel 2 and traveling in the direction of the arrow 3. As the web-form material 1 is pre-printed with designs 24 corresponding to the inner seals that are to be manufactured, identification can be performed easily and the antennas 22 are positioned by the device 23 to correspond to the printed designs 24 and, in particular, are aligned with these patterns 24. Downstream of the region in which the antennas 22 are affixed, a cutting tool 6 actuated by a ram 7 makes successive cuts in the web-form material 1 according to the printed designs 24. Thus, these cuts isolate the heat-sealable inner seals 25, each equipped with a detectable device, in this instance in the form of an antenna 22. The inner seals 25 thus manufactured are stacked up, possibly stored, and dispatched to a user some distance away who will fit them onto containers such as pots. FIG. 13 shows a pot 26 thus equipped with a heat-sealed inner seal 25, itself equipped with a detectable device in the form of an antenna 22. The pot 26 in this instance takes a screw-on lid 27 which, when closed, covers and conceals the inner seal 25 and its antenna 22.

By way of an alternative to FIGS. 12 and 13, FIG. 14 illustrates the possibility of manufacturing heat-sealable inner seals 25 each equipped with a detectable device produced in the form of an electronic tag 11. As before, the electronic tags 11 are affixed to the web of heat-sealable material 1 which is traveling, using a device of the labeling machine type 23, before traveling past the cutting tool 6 which separates the inner seals 25 each in this instance equipped with an electronic tag 11.

Finally, FIGS. 15 to 17 depict the shape and/or structure of various detectable devices to which the present invention may be applied, in greater detail, it therefore being possible for these devices to be deposited on material in the form of a web 1 from which individual elements such as gaskets or inner seals described previously, are then cut.

According to FIG. 15, the detectable device is a length of filament 4 bent into a "U". According to FIG. 16, the detectable device is an antenna 22 formed of two small rectangular panels 28 connected together by a short filament 29. The filament 4 and the antenna 22 shaped in this way can be detected electromagnetically.

In FIG. 17, the detectable device consists of an electronic tag 11 consisting of an electronic chip 30 containing specific information (the name of the manufacturer of the product, the production site, the distribution route), to which a miniaturized antenna 31 is connected. The electronic tag 11 formed in this way, can be detected by radiofrequency.

As goes without saying, the invention is not restricted to the simple embodiments of this process for the manufacture of anti-theft and/or traceability devices associated with stoppering and covering means which have been described hereinabove by way of example: on the contrary, it encompasses all alternative forms and alternative applications thereof which employ the same principles. In particular, it would not be departing from the scope of the invention:

- if, when manufacturing gaskets equipped with detectable devices, these gaskets pre-equipped with filaments or electronic tags were stacked up and stored and then fitted into the caps only at a later stage, either in situ or at a distant site;
- if, when manufacturing outer covers, the detectable device was placed not on the "sleeve" part of the outer caps but under the pellet which closes these outer covers at one of their ends;
- if, when manufacturing heat-sealable inner seals, detectable devices of any kind were to be affixed to these inner seals;
- if, in general, the process were to be implemented using detectable devices of any type and any shape, such as oriented-particles films, usable either as simple anti-theft devices or also to carry information or as anti-falsification devices;
- if the process were to be applied to stoppering and covering means of all kinds, made of all materials, intended for all kinds of container;
- if the process were to be implemented using any means or tools suited to each particular scenario, for example with an ink spray gun, when the detectable device consists of a printing of magnetic ink.

What is claimed is:

1. A process for manufacturing remote-detectable devices associated with means for stoppering containers, comprising:

unwinding a material in web form and causing it to travel along in a predetermined direction;

depositing continuously at least one detectable device on the web-form material in the predetermined direction;

cutting said web-form material according to the at least one detectable device deposited on it so as to separate the at least one detectable device into individual detectable elements, and constituting stoppering means or parts of such means.

2. The process as claimed in claim 1, wherein at least one continuous filament is unwound at the same time as the web-form material, this filament being deposited and fixed to said web-form material in the predetermined direction and wherein detectable elements, once separated, each comprise a length of filament cut in succession from this web-form material.

3. The process as claimed in claim 2, wherein two or more continuous filaments are unwound and deposited simultaneously on the web-form material, and wherein transverse rows of two or more detectable elements are cut in succession from the web-form material according to the number and position of the filaments so that each of these detectable elements, once separated, comprises a length of filament.

4. The process as claimed in claim 3, which is designed to obtain disk-shaped gaskets for stoppering caps, these gaskets each being equipped with a length of filament arranged across a diameter.

5. The process as claimed in claim 1, wherein at least one continuous tape, preferably an adhesive tape, is unwound at the same time as the web-form material, this tape bearing separate detectable devices at regular intervals, the at least one tape is deposited on the web-form material in the predetermined direction and detectable elements, once separated, each comprise a detectable device cut in succession from the web-form material.

6. The process as claimed in claim 5, wherein two or more continuous tapes, each of which bears separate detectable devices at regular intervals are unwound or deposited in parallel lines on the traveling web-form material, and transverse rows of two or more detectable elements are cut in succession from this web-form material according to the number and position of the tapes, so that each of these detectable elements, once separated, comprise a detectable device.

7. The process as claimed in claim 1, wherein separate detectable devices are deposited in succession on the traveling web-form material and detectable elements of the inner seal type, each comprising a detectable device are then cut in succession from this web-form material according to the detectable devices deposited.

8. The process as claimed in claim 7, wherein the web-form material is pre-printed with designs which correspond to the future inner seals, and wherein the detectable devices are positioned according to the printing on the web-form material, and therefore according to the positions of the inner seals that are to be cut from this web-form material.

* * * * *